(12) United States Patent
Turner et al.

(10) Patent No.: US 7,203,871 B2
(45) Date of Patent: Apr. 10, 2007

(54) ARRANGEMENT IN A NETWORK NODE FOR SECURE STORAGE AND RETRIEVAL OF ENCODED DATA DISTRIBUTED AMONG MULTIPLE NETWORK NODES

(75) Inventors: Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 10/859,209

(22) Filed: Jun. 3, 2004

(65) Prior Publication Data

US 2005/0273686 A1    Dec. 8, 2005

(51) Int. Cl.
G11C 29/52 (2006.01)
G11C 29/42 (2006.01)

(52) U.S. Cl. .................. 714/710; 714/784; 711/148

(58) Field of Classification Search ............ 714/710, 714/784; G11C 29/42, 29/52
See application file for complete search history.

(56) References Cited

U.S. PATENT DOCUMENTS

| | | | |
|---|---|---|---|
| 5,937,428 A | 8/1999 | Jantz | |
| 6,024,486 A | 2/2000 | Olarig et al. | |
| 6,173,374 B1 * | 1/2001 | Heil et al. ................. | 711/148 |
| 6,307,487 B1 | 10/2001 | Luby | |
| 6,373,406 B2 | 4/2002 | Luby | |
| 6,411,223 B1 | 6/2002 | Haken et al. | |
| 6,425,052 B1 | 7/2002 | Hashemi | |
| 6,486,803 B1 | 11/2002 | Luby et al. | |
| 6,557,123 B1 | 4/2003 | Wiencko, Jr. et al. | |
| 6,614,366 B2 | 9/2003 | Luby | |
| 2002/0190878 A1 | 12/2002 | Luby | |
| 2003/0046637 A1 * | 3/2003 | Zhang ....................... | 714/784 |
| 2003/0058958 A1 | 3/2003 | Shokrallahi et al. | |
| 2003/0226089 A1 | 12/2003 | Rasmussen | |
| 2004/0021588 A1 | 2/2004 | Luby | |
| 2004/0075592 A1 | 4/2004 | Shokrollahi et al. | |
| 2004/0075593 A1 | 4/2004 | Shokrollahi et al. | |
| 2004/0101274 A1 | 5/2004 | Foisy et al. | |
| 2006/0107131 A1 * | 5/2006 | Mills et al. ................. | 714/710 |
| 2006/0161823 A1 * | 7/2006 | Sato .......................... | 714/710 |

OTHER PUBLICATIONS

Reed et al., "Polynomial Codes Over Certain Finite Fields", *J. Soc. Indust. Appl. Math.*, Jun. 1960, pp. 300-304, vol. 8, No. 2.

(Continued)

*Primary Examiner*—R. Stephen Dildine
(74) *Attorney, Agent, or Firm*—Leon R. Turkevich (57) ABSTRACT

Data is stored using multiple selected network nodes in a network based on encoding of the data into multiple distinct encoded data units according to a prescribed encoding operation. The secure encoding operation generates a first prescribed number of encoded data units, whereas merely a second prescribed number of the encoded data units are necessary for recovery of the original data, the second prescribed number being less than the first prescribed number. The encoded data units are distributed among selected network nodes in a network, where any one network node receives less than the second prescribed number to ensure security. A requesting node recovers the original data by requesting the second prescribed number of encoded data units from among the network nodes having stored the respective encoded data units.

72 Claims, 6 Drawing Sheets

OTHER PUBLICATIONS

Cates, "Robust and Efficient Data Management for a Distributed Hash Table", Master's thesis, Mass. Institute of Technology, May 2003.

Liben-Nowell et al., "Analysis of the Evolution of Peer-to-Peer Systems", ACM Conf. On Principles of Distributed Computing (PODC), Monterey, CA, Jul. 2002.

Karger et al., "Finding Nearest Neighbors in Growth-restricted Metrics", ACM Symposium on Theory of Computing (STOC '92), Montreal, May 2002.

Stoica et al., "Chord: A Scalable Peer-to-peer Lookup Protocol for Internet Applications", date unknown.

Cox et al., "Serving DNS using a Peer-to-Peer Lookup Service", In the proceedings of the First International Workshop on Peer-to-Peer Systems (IPTPS '02), Mar. 2002, Cambridge, MA.

Liben-Nowell et al., "Observations on the Dynamic Evolution of Peer-to-Peer Networks", In the proceedings of the First International Workshop on Peer-to-Peer Systems (IPTPS '02), Mar. 2002, Cambridge, MA.

Sit et al., "Security Considerations for Peer-to-Peer Distributed Hash Tables", In the proceedings of the First International Workshop on Peer-to-Peer Systems (IPTPS '02), Mar. 2002, Cambridge, MA.

Dabek, "A Cooperative File System", Master's Thesis, Massachusetts Institute of Technology, Sep. 2001.

Dabek et al., "Wide-area cooperative storage with CFS", ACM SOSP 2001, Banff, Oct. 2001.

Stoica et al., "Chord: A Scalable Peer-to-peer Lookup Services for Internet Applications", ACM SIGCOMM 2001, San Diego, Aug. 2001, pp. 149-160.

Dabek et al., "Building Peer-to-Peer Systems With Chord, a Distributed Lookup Service", Proceedings of the 8th Workshop on Hot Topics in Operating Systems (HotOS-VIII), May 2001.

Burkard, "Herodotus: A Peer-to-Peer Web Archival System", Master's Thesis, Massachusetts Institute of Technology, Jun. 2002.

* cited by examiner

Figure 5B

ARRANGEMENT IN A NETWORK NODE FOR SECURE STORAGE AND RETRIEVAL OF ENCODED DATA DISTRIBUTED AMONG MULTIPLE NETWORK NODES

BACKGROUND OF THE INVENTION

1. Field of the Invention

The present invention relates to distributed storage of data in a secure and fault-tolerant manner and retrieval of such data from distributed data stores using fault-tolerant recovery techniques.

2. Description of the Related Art

Data storage and retrieval technology requires the availability of data in a timely manner. Basic data storage techniques involve generating a copy of the original data as a backup: such backup systems include simultaneous copying to two or more storage locations (e.g., simultaneous copying to two hard drives), and archival of data. Data archival has progressed from tape backup systems, to backups using compact disc (CD-R) technology, etc.

Such storage and retrieval techniques are substantially inefficient in terms of processing requirements, disk space, and time constraints. For example, distributed storage systems typically maintain duplicate copies of data on multiple, disparate machines to avoid failures in the case of one or more nodes fails. The distribution of duplicate copies, also referred to as r-replication, copies the data, in whole, among R separate storage devices in a system. In case of a failure, any one of the nodes may service a request for data.

The use of r-replication may be effective for closed storage services, such as servers having a Redundant Array of Inexpensive Disks (RAID), also referred to as RAID servers, or corporate mirroring servers. However, r-replication cannot be implemented efficiently in ad hoc or unreliable networks such as the Internet because each replication substantially increases the total storage requirements of the data; hence, typical implementations of r-replication use a minimal number of copies (e.g., a RAID 0 system uses only two copies (R=2).

In particular, use of an r-replication system is extremely inefficient if a given storage device is available on average only fifty percent of the time: if two storage nodes have a fifty percent availability, then the aggregate guaranteed data availability is limited to seventy-five percent for two copies (R=2). In other words, in order to guarantee ninety-five (95) percent availability, five copies (R=5) of the data would be required, effectively limiting the storage capacity of a system to twenty percent its total capacity. Further, the necessity of multiple read requests ordered sequentially to the duplicate storage devices substantially reduces the throughput of the system, especially each time a read request fails.

Another problem in using r-replication involves rogue nodes that maliciously or inadvertently return incorrect data to a requesting source (e.g., due to read/write errors or transmit/receive errors). Security against rogue nodes requires additional redundancy within the system, requiring an even higher number of duplicate copies to be added to the system.

Other problems associated with data storage involve large scale recovery of data, for example due to a disaster recovery scenario. Typical systems that rely on a centralized data store run the risk of complete data loss in the event the data storage is damaged or destroyed. Hence, conventional redundancy-based replication systems may be ineffective in the case that all the data stores are located within a specific geographic area having encountered a disaster (e.g., fire, etc.).

Still another problem associated with data storage involves the relative portability of data and the ability of users to access the data from different locations. One example involves an enterprise system having multiple offices, where a user moves from one office to another office. Conventional systems require a complete reconfiguration of the user's portable computer before access to any data store (e.g., e-mail) is possible.

SUMMARY OF THE INVENTION

There is a need for an arrangement that data to be distributed among different network nodes in an efficient and secure manner.

There also is a need for arrangement that enables data to be stored in a fault-tolerant matter, where data can be recovered despite the unavailability of certain network nodes.

There also is a need for an arrangement that provides distributed data storage in a network in a manner that provides both redundancy to protect against network nodes encountering failures, and resiliency in recovering data in an efficient manner despite loss of the network nodes having encountered the failures.

These and other needs are attained by the present invention, where data is stored using multiple selected network nodes in a network based on encoding of the data into multiple distinct encoded data units according to a prescribed encoding operation. The secure encoding operation generates a first prescribed number of encoded data units, whereas merely a second prescribed number of the encoded data units are necessary for recovery of the original data, the second prescribed number being less than the first prescribed number. The encoded data units are distributed among selected network nodes in a network, based on identified attributes of the unencoded data unit. A requesting node recovers the original data by requesting the second prescribed number of encoded data units from among the network nodes having stored the respective encoded data units.

Hence, data redundancy and resiliency is established by distributing the encoded data units among multiple network nodes for storage therein. Moreover, the availability of more than the minimum number of encoded data units in a network enables the requesting device to select the optimum devices for recovery of the data, for example based on distance, throughput, loading, etc.

One aspect of the present invention provides a method in a network node configured for connection to a network. The method includes encoding an unencoded data unit into a first prescribed number of encoded data units according to a prescribed encoding operation. The prescribed encoding operation causes each encoded data unit to be distinct from other ones of the encoded data units. The prescribed encoding operation also requires at least a second prescribed number of the encoded data units for recovery of the unencoded data unit, where the second prescribed number is less than the first prescribed number. The method also includes distributing the first prescribed number of encoded data units among selected network nodes for storage of the encoded data units in the network. The distributing includes selecting the selected network nodes based on identified attributes of the unencoded data unit.

Another aspect of the present invention provides a method in a network node configured for connection to a network. The method includes requesting from among network nodes a first prescribed number of encoded data units. The encoded data units have been generated based on encoding an unencoded data unit into a second prescribed number of the encoded data units according to a prescribed encoding operation. The first prescribed number of encoded data units represent a minimum number of the encoded data units required for recovery of the unencoded data unit. Each encoded data unit is distinct from other ones of the encoded data units, and the second prescribed number is greater than the first prescribed number. The method also includes obtaining the first prescribed number of encoded data units from the network, including receiving less than the first prescribed number of encoded data units from any network node that supplies any one of the encoded data units. The method also includes recovering the unencoded data unit based on decoding the obtained first prescribed number of encoded data units.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
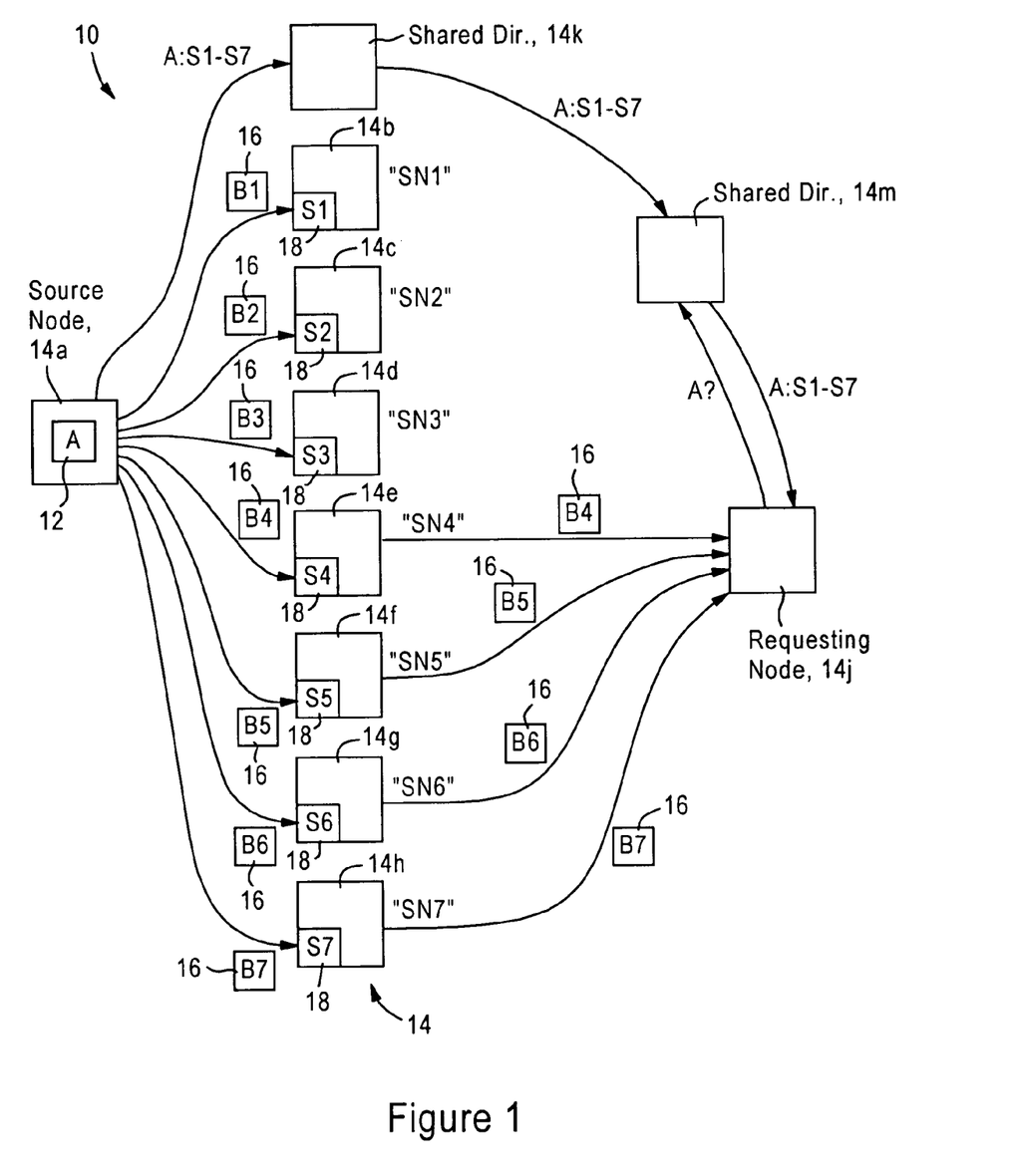
FIG. 1 is a diagram illustrating a network having nodes configured for distributed storage of encoded data units used for recovery of an unencoded data unit, according to an embodiment of the present invention.

FIG. 1 is a diagram illustrating a network 10 configured for providing distributed services, for example distributed storage of a message (A) 12, according to an embodiment of the present invention. The network 10 may be configured as a conventional Ethernet-based network, a mobile ad hoc network as described by the Mobile Ad-Hoc Networks (MANET) Working Group of the Internet Engineering Task Force, or any IP-based network.

The network 10 is composed of network nodes 14, for example client workstations such as laptop computers, stationary workstations, and the like. A particular feature of the disclosed embodiment is that the methods described herein do not necessarily rely on a client/server based protocol that requires a centralized server, but rather relies on providing distributed services among different network nodes 14 according to a peer-to-peer based model. Consequently, the methods described herein can be implemented by any network node, for example mobile laptop computers.

The distributed data storage of the disclosed embodiment is implemented based on a network node 14a having a message 12 for storage, for example an e-mail message, an application file, a MIME encoded file, a binary file, etc. Regardless of the message format, the message 12 can be considered as an unencoded data unit that typically is stored in its atomic (i.e., indivisible) form.

The network node 14a having the message 12 for storage, also referred to herein as the source network node, is configured for encoding the message (A) 12 using a prescribed encoding operation, namely Reed Solomon encoding, into a plurality (M) of encoded data units (B1–B7) 16. The encoded data units (B1–B7) 16 are stored in respective network nodes "SN1" through "SN7" (e.g., 14b, 14c, 14d, 14e, 14f, 14g, 14h) at respective storage locations (S1–S7) 18. The encoded data units 16 can be later retrieved by the source network node 14a for recovery of the message 12, based on retrieving the desired encoded data units 16 from among the storage nodes 14b through 14h that are determined to be the most appropriate for retrieval by the source network node 14a. The storage locations (S1–S7) 18 for the respective encoded data units (B1–B7) 16 associated with the corresponding message (A) also may be sent to a shared directory 14k, enabling any network node to obtain the location information (S1–S7) for recovery of the original message (A). Further, the storage location information can be distributed to other shared directories 14m, enabling a requesting node 14j to obtain the storage location information for the original message 12 for recovery of the original message (A) 12, even in cases where the source network node 14a may no longer be available on the network 10.

Hence, the distributed storage of encoded data units 16 among multiple storage nodes "SN1" through "SN7" (e.g., 14b through 14h) ensures data can be recovered, even in cases where the source network node 14a is no longer available. Moreover, the nature of Reed Solomon encoding provides security and redundancy, since each encoded data unit 16 is unreadable without a prescribed minimum number (N) of other encoded data units 16.

Figure 2:
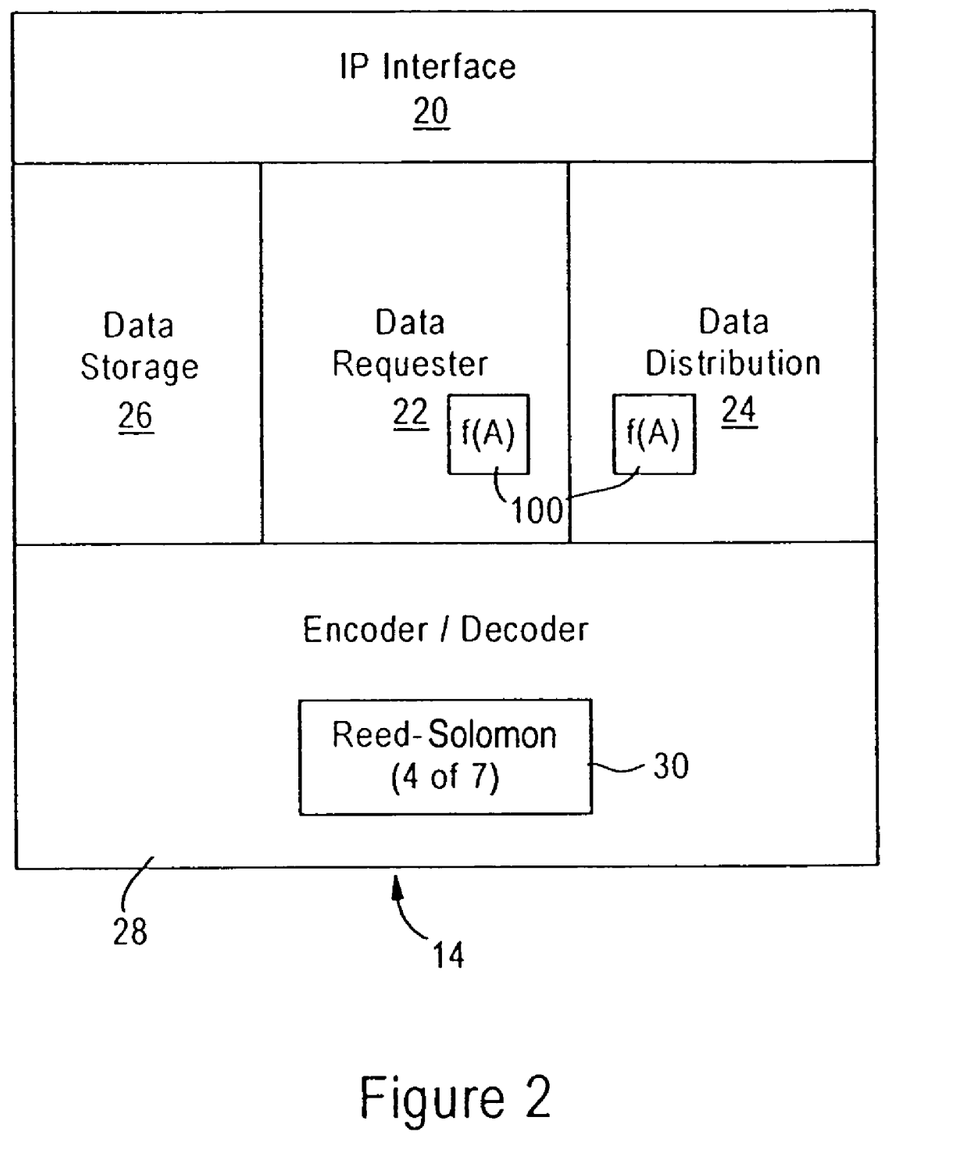
FIG. 2 is a block diagram illustrating one of the network nodes of FIG. 1.

FIG. 2 is a block diagram illustrating in detail a network node 14 configured for encoding an unencoded data unit (A) 12 into encoded data units (B1–B7) 16, storing an encoded data unit 16 having been received from a source network node, and/or obtaining selected encoded data units 16 for recovery of the original unencoded data unit (A) 12, according to an embodiment of the present invention.

Each network node 14 includes a network interface 20, a data requester portion 22, a data distribution portion 24, a data storage portion 26, and an encoder/decoder portion 28 including a Reed Solomon encoder/decoder 30. Each of the modules 22, 24, 26, and 28 can be implemented based as software-based executable resources, or hardware/firmware-based state machines.

The network interface 20 is configured for communicating with the different network nodes 14 according to a prescribed network protocol, such as Internet Protocol, and as such is configured for sending and receiving requests and responses, respectively, and sending and receiving encoded data units 16 within the network 10 as described herein. The encoder/decoder portion 28 is configured for encoding a local (i.e., one stored within the corresponding network node 14) unencoded data unit 12 into a prescribed number of encoded data units 16, described below with respect to FIG. 3.

The data distribution portion 24 is configured for distributing the encoded data units (B1–B7) 16 among the plurality of selected network nodes "SN1" through "SN7" (e.g., 14b through 14h) according to prescribed selection parameters, described below.

The data requester portion 22 is used by the network node 14 for obtaining the encoded data units 16 in order to recover the original unencoded data unit (A) 12. The data requester portion 22 is configured for requesting among the plurality of network nodes "SN1" through "SN7" (e.g., 14b through 14h) a minimum number of the encoded data units 16 that are required for recovery of the original unencoded data unit (A) 12. As described below, the data requester portion 22 can be configured for sending the request to selected network nodes based on prescribed selection criteria; alternately the data requester portion 22 can be configured for sending a broadcast message that requests the encoded data units 16 associated with the original message (A) 12.

The data storage portion 26 is configured for storing the encoded data units 16 received from a remote source network node, or possibly locally generated encoded data units 16. For example, the data storage portion 26 is configured for listening for read/write commands received by the IP interface 20 on prescribed TCP ports.

It should be noted that a given network node 14 can be selected to store more than one encoded data unit 16; for example, the data distribution portion 24 may select the node "SN1" 14b to store the encoded data units "B1", "B3" and "B5" and may further select the node "SN2" 14c to store the encoded data units "B2", "B4", and "B6", enabling the recovery of unencoded data unit 12 by the node 14b merely by retrieving any one of the encoded data units "B2", "B4", "B6" or "B7" from any of the nodes 14c, 14e, 14g, or 14h. In all implementations and variations where security is desired, however, the data distribution portion 24 is preferably configured to ensure that no network node has enough of the minimum (N) encoded data units 16 that are necessary for recovery of the unencoded data unit (A) 12. In other words, the data distribution portion 24 ensures that any one of the network nodes receives less than the prescribed minimum number (N) of encoded data units 16 necessary for recovery of the original unencoded data unit (A) 12 according to Reed Solomon decoding.

The data distribution portion 24 and the data requester portion 22 also may optionally include a prescribed function f(A) 100 configured for selecting the storage addresses (S1 through S7) 18 based on the identifier A for the unencoded data unit 12.

Figure 3:
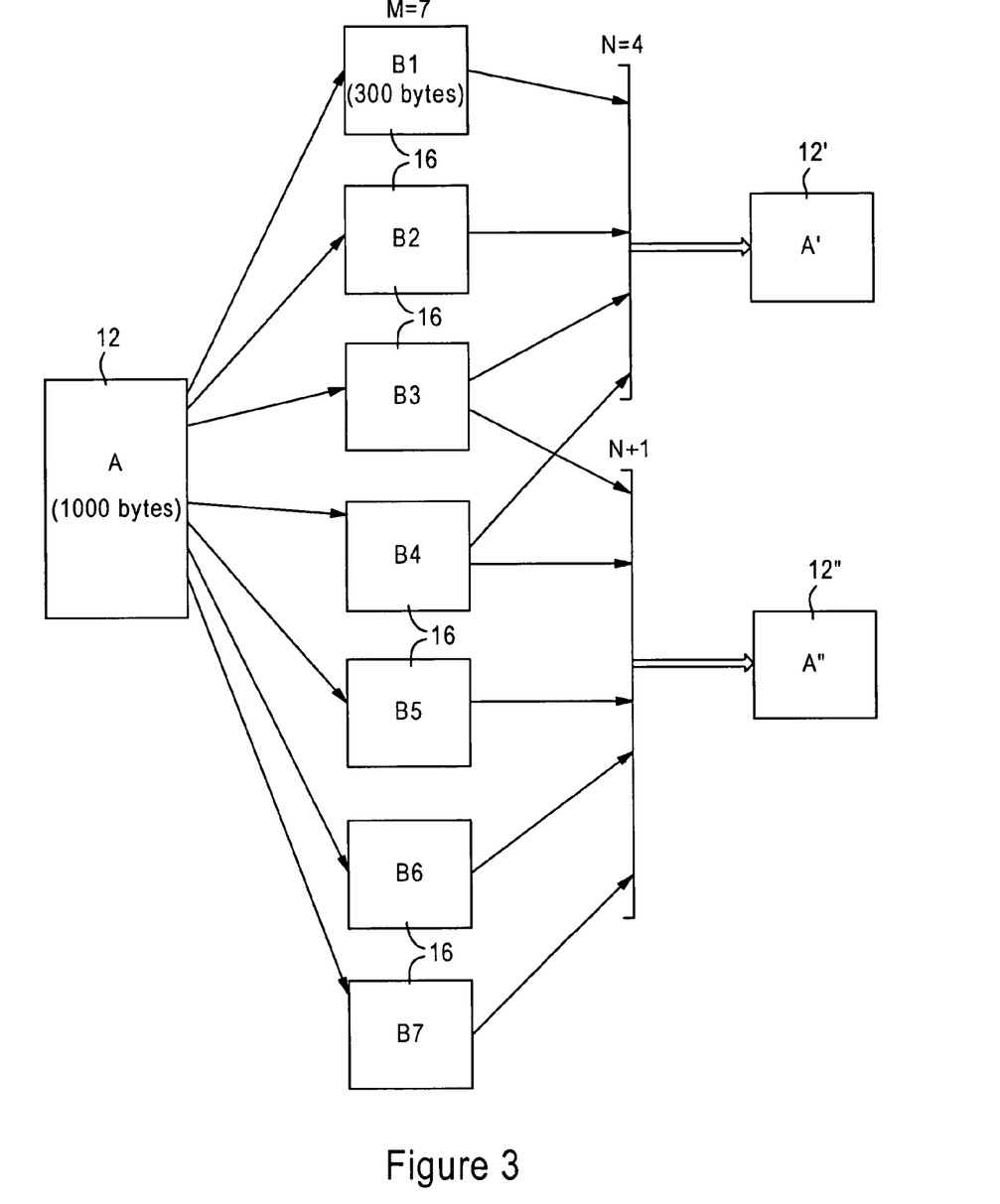
FIG. 3 is a diagram illustrating in detail Reed-Solomon encoding and decoding as used by the source network node and requesting node of FIG. 1, respectively, for storage and recovery of the unencoded data unit according to an embodiment of the present invention.

FIG. 3 is a diagram illustrating in detail the Reed Solomon encoding and decoding performed by Reed Solomon encoder 30, according to an embodiment of the present invention. The source network node 14a is configured for encoding the message (A) 12 into a first prescribed number (M=7) of encoded data units B1, B2, B3, B4, B5, B6, and B7, identified by reference numeral 16. Assuming the unencoded data unit (A) 12 has a size of about one thousand (1000) bytes, each encoded data unit 16 has a size of about 300 bytes. Further, each encoded data unit 16 is distinct from each of the other encoded data units 16, such that the encoded data units B1, B2, B3, B4, B5, B6, and B7 are unique relative to each other. Finally, each of the encoded data units 16 are encoded in a manner such that any one encoded data unit 16 cannot be used to read a portion of the original unencoded data unit (A) 12 (i.e., is unreadable) without the prescribed minimum number (N=4) of encoded data units 16.

Hence, the Reed Solomon encoding executed by the encoder 30 requires a minimum number of encoded data units (N=4) in order to recover the unencoded data unit 12. In particular, the Reed Solomon encoder/decoder 30 generates a recovered unencoded data unit 12' from the minimum number (N=4) of encoded data units 16, where any one of the encoded data units B1 through B7 may be selected for generation of the recovered data unit 12'. Note that if any one of the minimum number (N=4) of encoded data units is corrupted, for example due to a storage error or manipulation by a malicious entity, the Reed Solomon encoder 30 will output an error. Hence, a network node 14 will receive either the recovered data unit 12' or an error message, eliminating concerns as to whether a given recovered data unit is valid.

The data requester portion 22 of a network node desiring to recover the unencoded data unit 12 (e.g., the requesting node 14j) therefore may be configured for selecting an additional (N+1) encoded data unit 16 in order to generate a higher-integrity recovered unencoded data unit 12". Hence, network nodes 14 are able to recover the original data 12 using the minimum number (N=4) of encoded data units 16, and are able to add integrity to the recovery of the original data unit 12 based on obtaining an additional (N+1=5) encoded data unit 16, substantially reducing the probability that any error exists when compared to the original unencoded data unit 12.

Hence, the disclosed embodiment is particularly effective in disaster recovery techniques, where multiple users of the respective nodes 14 need to regroup at a secure location: the disclosed recovery of Reed Solomon encoded data units 16 enables the users to recover their data structures, without the necessity of a centralized backup or recovery mechanism. Also note that the disclosed embodiment is particularly effective in cases where different groups of users are divided, for example due a group of the users traveling to a remote location; in this case, if the users' laptop computers collectively include at least the minimum number (N=4) of encoded data units 16, the users have access to all of the stored data 12 without the necessity of any network connection to a centralized data store.

Figure 4:
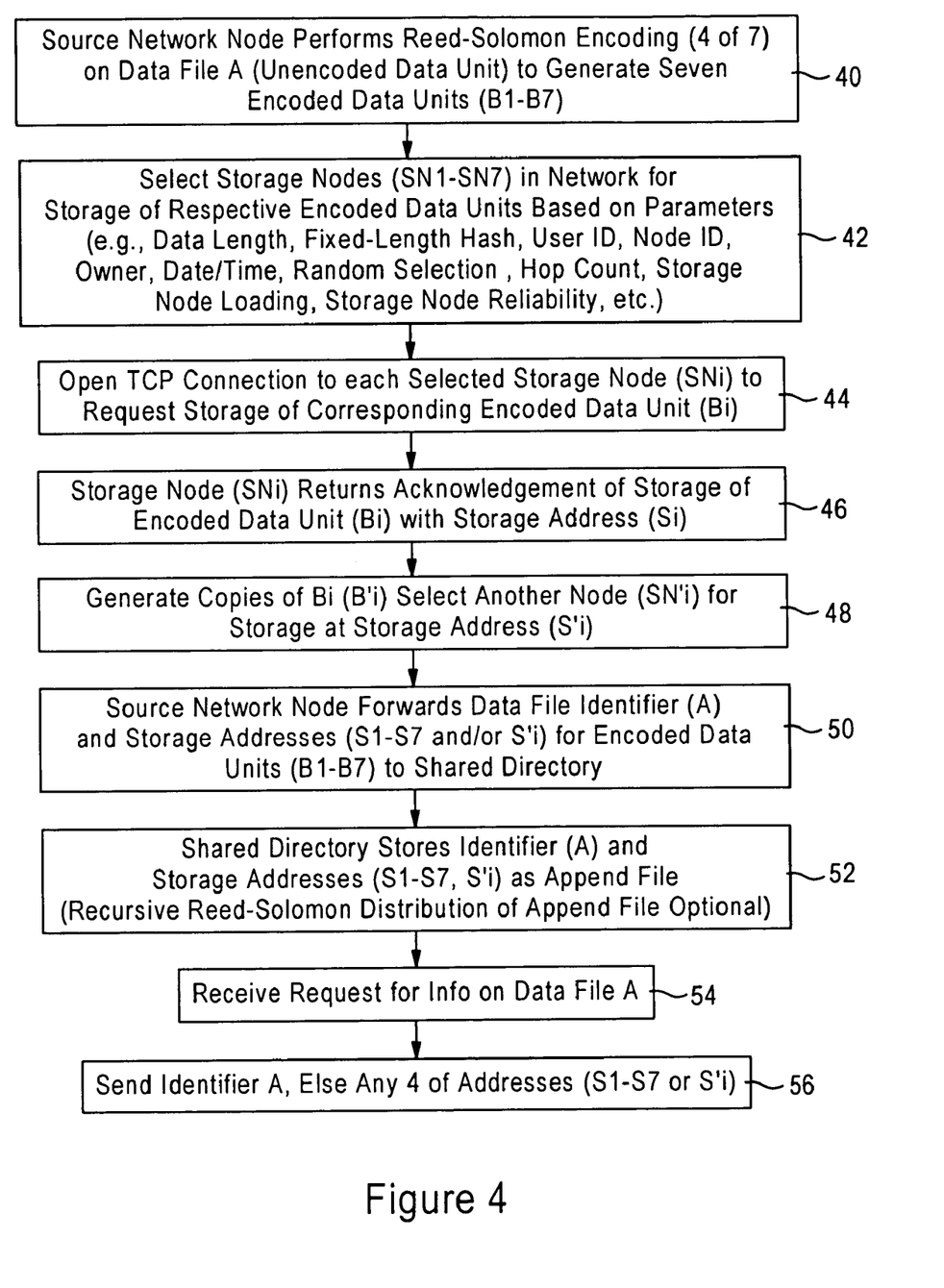
FIG. 4 is a diagram illustrating the method of distributed storage of the unencoded data unit based on distributing Reed-Solomon encoded data units, according to an embodiment of the present invention.
Figure 5A:
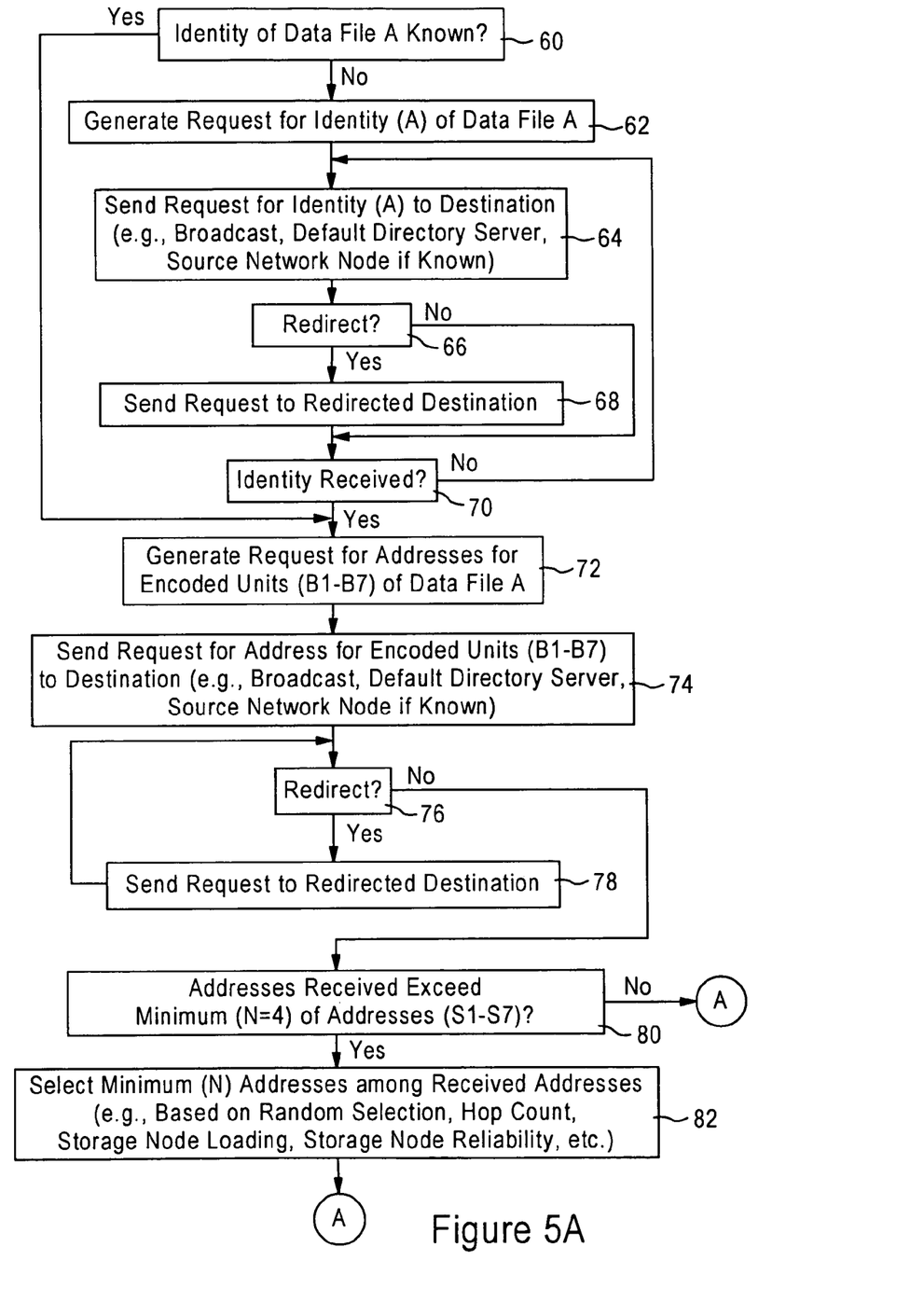
FIGS. 5A and 5B are diagrams illustrating the method of retrieving the encoded data units for recovery of the unencoded data unit, according to an embodiment of the present invention.
Figure 5B:
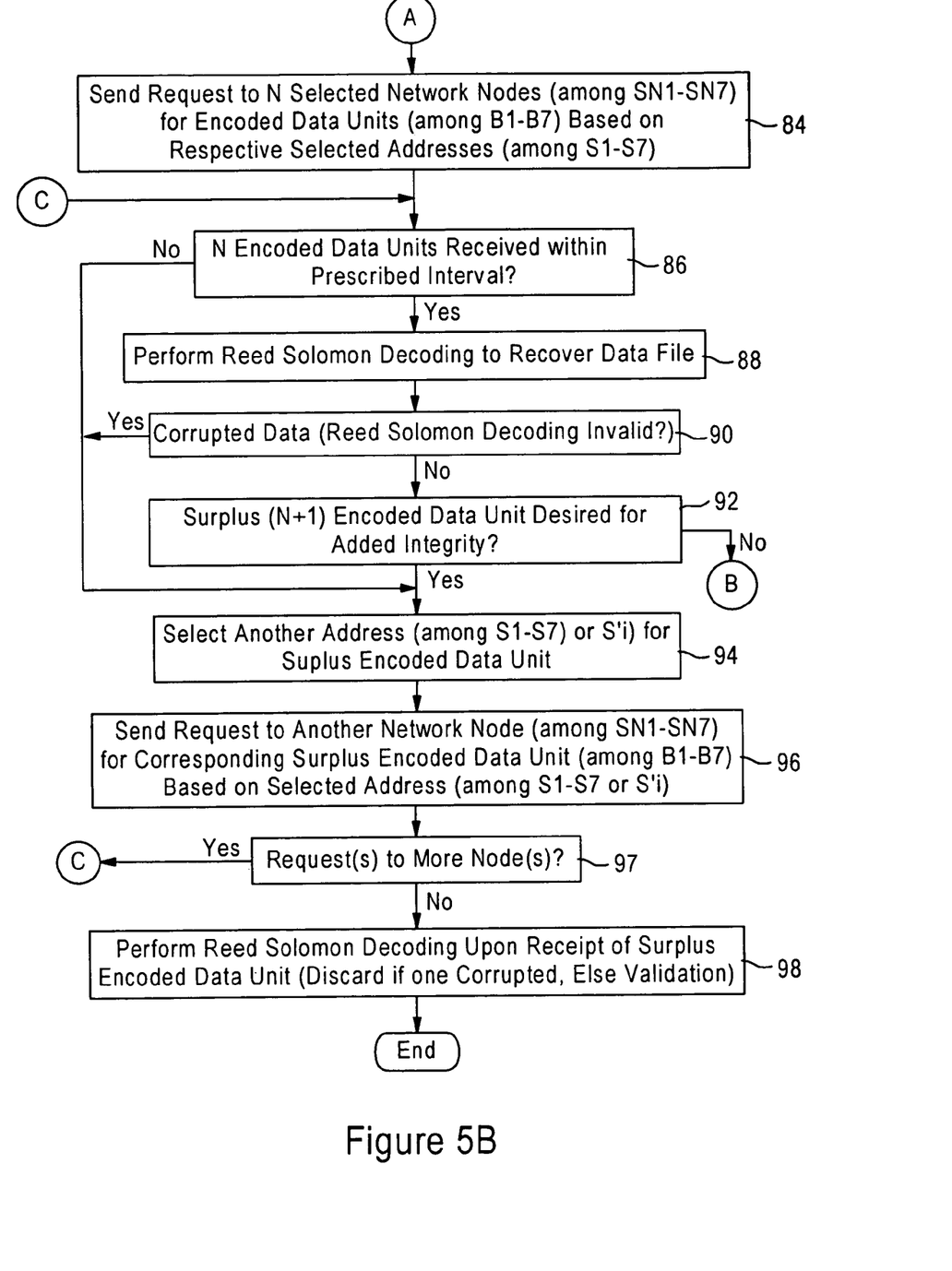

FIG. 4 is a diagram illustrating the method of distributed storage of the unencoded data unit based on distributing Reed-Solomon encoded data units, according to an embodiment of the present invention. FIGS. 5A and 5B are diagrams illustrating the method of retrieving the encoded data units for recovery of the unencoded data unit, according to an embodiment of the present invention. The steps described herein with respect to FIG. 4 and FIGS. 5A and 5B can be implemented in each network node 14 as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 40, where the encoder portion 28 in the source network node 14a performs Reed Solomon encoding using the encoder 30 in order to generate seven encoded data units (B1–B7) 16. As described above, each encoded data unit 16 is distinct from each of the other encoded data units. Further, each encoded data unit 16 is unreadable relative to the unencoded data unit (A) 12.

The data distribution module 24 selects in step 42 the storage nodes (SN1–SN7), from among the available network nodes (e.g., 14*b* through 14*m*), that are to be used for storing the respective encoded data units (B1–B7). In particular, the data distribution module 24 may be configured for selecting the storage nodes based on identified attributes of the unencoded data unit (A) 12, for example length of the unencoded data unit 12, fixed-length hash of the data unit 12 (e.g., SHA-1, MDS, etc.), identity of the user making the request for storage of the data unit 12, identity of the node making the request for storage of the data unit 12, owner of the data unit 12, date/time of the request, etc. The selection also may be based on different selection attributes, including random selection, hop count indicating distance from the source network node 14*a*, node performance, and/or reliability of the corresponding selected network node. Reliability can be quantified in various ways, for example storage node loading, storage node reliability, availability (e.g., 40 percent versus 80 percent) of the storage node within the network 10, etc.

Once the data distribution module 24 has identified the selected storage nodes (SN1–SN7), the data distribution module 24 opens in step 44 a TCP connection to each selected storage node (SNi) to request storage of the corresponding encoded data unit (Bi) 16; for example, the storage node SN1 14*b* receives a request for storage of the corresponding encoded data unit B1. If no acknowledgment is received from the storage node (e.g., 14*b*), or if the storage node returns a reply that denies the request for storage of the corresponding encoded data unit 16, the data distribution module 24 may select an alternative storage node for storage of the corresponding encoded data unit 16.

Assuming in step 46 that a storage node (SNi) returns an acknowledgment for storing the encoded data unit (e.g., B1) 16, the storage node (e.g., SN1 14*b*) includes with the acknowledgment a storage address Si (e.g., S1) 18 that specifies the stored location of the corresponding encoded data unit (e.g., B1). The storage address 18 is an address that is valid within the network 10, and hence usable by any node 14 in requesting the corresponding encoded data unit 16. Consequently, any network node 14 can recover the original unencoded data unit (A) 12 without accessing the source network node 14*a*, merely by obtaining at least the minimum number (N=4) of addresses (e.g., S1, S2, S3, S4) from a distributed service such as the shared directories 14*k* and/or 14*m*, and retrieving the respective encoded data units (e.g., B1, B2, B3, B4) 16 from the respective storage nodes (e.g., SN1, SN2, SN3, and SN4).

An optional feature is that the source network node 14*a* may generate copies (B'i) of any one of the encoded data units (Bi) 16 in step 48, and select another node (SN'i) for storage of the copy at a storage address (S'i). Hence, multiple copies of the encoded data units 16 provides further redundancy and resiliency for the recovery of the original unencoded data unit (A) 12.

As described above, different retrieval options are available: one such retrieval option involves a requesting node sending a query directly to the source network node 14*a* having generated the encoded data units 16, in order to determine the respective storage addresses 18. Sending a query directly to the source network node 14*a* provides additional advantages with respect to peer-to-peer security and authentication of the requesting resource. Alternatively, shared directories 14*k*, 14*m* may be used to store the storage addresses 18 in order to provide distributed services throughout the network.

Hence, the data distribution module 24 may be configured to the output via the IP interface 20 the storage addresses 18 to a shared directory 14*k* in step 50. For example, the data distribution module 24 may forward a data file identifier (A) with the storage addresses (S1–S7) 18, along with the storage addresses (S'i) of any copies (B'i) of the encoded data units 16. The shared directory 14 stores in step 52 the identifier (A) and the associated storage addresses (S1–S7) 18, for example as an append file or other directory construct. Hence, successive versions of the original unencoded data file 12 may be identified by the shared directory 14*k* based on appending the respective storage addresses 18 associated with the successive versions. Also note that the shared directory 14*k* may be configured for storing the append file using the above-described Reed Solomon encoding, such that the directory itself is distributed throughout the network 10.

As described above, the data distribution portion 24 of the source network node 14*a* also may be configured for responding to a request in step 54 by sending the identifier and/or any minimum number of the storage addresses 18 in step 56 based on the above-described selection criteria.

FIGS. 5A and 5B are diagrams summarizing the method by the requesting node 14*j* of obtaining the encoded data units 18 for recovery of the unencoded data unit (A) 12, according to an embodiment of the present invention.

The method begins in step 60, where the data requester resource 22 of the requesting node 14*j* determines whether the identity of the data file is known to level of specificity that enables the data requester resource 22 to request the storage addresses. For example, the requesting node 14*j* may need to generate in step 62 a request to the shared directory 14*k* or 14*m*, for example in the form of an LDAP query, if only certain attributes of the data file 12 are known. For example, in the case of an e-mail message, the requesting node 14*j* may send a query for identification of an e-mail message having been sent by a specific user at a prescribed time and date; alternately, the requesting node 14*j* may utilize a dynamic domain name server (DNS) query to a default service that identifies the nodes that are most appropriate for responding to a query for the message identity.

The data requester resource 22 sends in step 64 a request for the identity (A) of the data file 12 to be recovered to a prescribed destination, for example a broadcast address, a default directory service providing dynamic DNS query services, or the source network node 14*a*, if known. If in step 66 the data requester resource 22 receives a redirect command, the data requester resource 22 sends in step 68 the request to the redirected destination. As apparent from the foregoing, multiple requests may be sent based on receipt of successive redirect responses.

In response to receiving the identity A in step 70, the data requester resource 22 generates in step 72 and sends in step 74 a request to a prescribed destination (e.g., a broadcast address, a default directory service such as the shared directory 14*m*, or the source network node 14*a*), requesting the addresses 18 for the encoded data units 16 based on the identifier "A" of the unencoded data unit 12. If a redirect response is received in step 76, the request is sent to the redirected destination in step 78; otherwise, the data requester resource 22 determines in step 80 whether the number of addresses 18 received exceed the minimum required number of addresses (N=4).

As illustrated in FIG. 2, it should also be noted that the data distribution portion 24 in the source node 14*a* and the data requester portion 22 in the requesting node 14*j* may be configured for selecting the storage addresses (S1 through S7) 18 according to a prescribed function f(A) 100 based on the identifier A for the unencoded data unit 12; in such a case, each of the nodes 14 can determine the addresses 18 merely based on the identity "A" of the unencoded data unit, eliminating the necessity for generating queries for the storage addresses 18.

If in step 80 the addresses received exceed the minimum number (N) of the total (M) addresses 18, the data requester resource 22 selects in step 82 the minimum (N) addresses based on prescribed selection criteria, for example random selection to insure load balancing, distance (e.g., hop count) storage node loading, storage node reliability, etc.

As shown in FIG. 5B, the request is sent in step 84 to the N selected network nodes from among the plurality of storage nodes SN1–SN7 for retrieval of the respective encoded data units 16 among B1–B7 based on the respective selected addresses 18 among S1–S7. As described above, any of the encoded data units 16 may be used for recovery of the original unencoded data unit 12, so long as the prescribed minimum number (N=4) are obtained. Note that if in step 80 only the minimum number of addresses are received, then the data requester resource 22 sends the request to all of the respective storage nodes based on the received addresses.

Once the minimum number of encoded data units 16 are received in step 86 by the data requester resource 22, the encoder/decoder portion 28 is able to perform Reed Solomon decoding in step 88 in order to recover the data file A' 12', shown in FIG. 3. As described above, the recovered data file 12' is generated using the minimum number of encoded data units 16: in certain cases additional encoded data units 16 may be used to add to the integrity of the recovered data file. Also, instances may arise where one of the storage nodes (SN1–SN7) may be unavailable, requiring retrieval of an alternate encoded data unit 16.

Hence, if the data requester 22 determines in step 86 the prescribed minimum number (N) of encoded data units 16 are not received within a prescribed interval, or in step 90 that one of the encoded data units 16 was corrupted based on the Reed Solomon decoder 30 outputting an error, or in step 92 the data requester resource 22 is configured for using a surplus (N+1) encoded data unit for added integrity, the data requester 22 selects in step 94 another address in order to obtain the surplus encoded data unit.

The data requester resource 22 outputs in step 96 the request for the surplus encoded data unit to another network node for the corresponding surplus encoded data unit, the encoded data units B1–B7 (or any copies thereof), and performs "N+1" based Reed Solomon decoding based upon receipt of the surplus encoded data unit in step 98. Note in step 97 that step 86 is repeated if data needs to be requested from more nodes. As apparent from the foregoing, the Reed Solomon decoding performed in step 98 can be executed by the replacement of one of the previously-received encoded data units, or applying the surplus encoded data unit to perform N+1 based Reed Solomon decoding.

According to the disclosed embodiment, data redundancy and resiliency is implemented in an efficient manner by distributing encoded data units among selected network nodes. Security is maintained because each encoded data unit is unreadable relative to the original unencoded data unit, and because each storage node receives less than the prescribed minimum number of encoded data units necessary for recovery of the unencoded data unit. Further, the total size of the encoded data units is approximately twice the original unencoded data unit, while providing resiliency by requiring less than the total number of encoded data units for recovery of the original unencoded data unit. Hence, the disclosed arrangement is more efficient than the conventional r-replication systems.

In addition, the disclosed arrangement enables a given network node to function as a source network node, a requesting node, a storage node, and/or a shared directory. Hence, the disclosed arrangement enables the deployment of decentralized services, eliminating the necessity of a prescribed server.

In addition, the use of Reed Solomon encoding enables a source network node and/or requesting node to select the storage locations to be accessed, based on prescribed selection attributes. Hence, resiliency is maintained, since a requesting node may have different selection criteria for accessing storage nodes, for example due to the proximity of the storage nodes using prescribed network parameters, for example bandwidth, hop count, etc.

Although the disclosed embodiment discloses use of N of M Reed Solomon encoding using the values N=4 and M=7, it will be readily apparent that other values for N and M may be used, as desired.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node configured for connection to a network, the method comprising:
    encoding an unencoded data unit into a first prescribed number of encoded data units according to a prescribed encoding operation, the prescribed encoding operation causing each encoded data unit to be distinct from other ones of the encoded data units, the prescribed encoding operation further requiring at least a second prescribed number of the encoded data units for recovery of the unencoded data unit, the second prescribed number being less than the first prescribed number; and
    distributing the first prescribed number of encoded data units among selected network nodes for storage of the encoded data units in the network, the distributing including selecting the selected network nodes based on identified attributes of the unencoded data unit.

2. The method of claim 1, wherein the encoding includes executing Reed Solomon encoding as the prescribed encoding operation.

3. The method of claim 2, wherein the first prescribed number equals at least seven (7) and the second prescribed number equals at least four (4).

4. The method of claim 2, wherein the distributing includes selecting the selected network nodes, from among available network nodes, based on a prescribed selection attribute.

5. The method of claim 4, wherein the prescribed selection attribute includes at least one of random selection, distance from the corresponding selected network node, and reliability of the corresponding selected network node.

6. The method of claim 4, wherein the selecting includes generating location identifiers for identifying respective encoded data units and the respective selected network nodes based on a prescribed function and applying, as the prescribed selection attribute, an identifier of the unencoded data unit.

7. The method of claim 2, wherein the distributing includes:
    generating a copy of at least one of the encoded data units; and sending the copy of the corresponding at least one encoded data unit to another selected network node distinct from the selected network node having received the corresponding at least one encoded data unit.

8. The method of claim 2, further comprising providing at least one identifier to another network node, distinct from the selected network nodes, for enabling identification and retrieval by the another network node of at least the second prescribed number of encoded data units.

9. The method of claim 8, wherein the at least one identifier includes storage addresses for the respective encoded data units stored in the network.

10. The method of claim 9, wherein the providing includes supplying the storage addresses in response to a request for access to the unencoded data unit from a requesting network node.

11. The method of claim 9, wherein the another network node is a prescribed shared directory configured for supplying groups of the storage addresses for recovery of respective unencoded data units by requesting network nodes.

12. The method of claim 8, wherein the providing includes supplying the identifier in response to a request for access to the unencoded data unit from the another network node.

13. The method of claim 1, wherein each encoded data unit is secure and unreadable relative to the unencoded data unit.

14. The method of claim 1, wherein the distributing including supplying less than the second prescribed number to any one of the network nodes.

15. A method in a network node configured for connection to a network, the method comprising:
    requesting from among network nodes a first prescribed number of encoded data units, the encoded data units having been generated based on encoding an unencoded data unit into a second prescribed number of the encoded data units according to a prescribed encoding operation, the first prescribed number of encoded data units representing a minimum number of the encoded data units required for recovery of the unencoded data unit, wherein each encoded data unit is distinct from other ones of the encoded data units, the second prescribed number greater than the first prescribed number;
    obtaining the first prescribed number of encoded data units from the network, the obtaining including receiving less than the first prescribed number of encoded data units from any network node that supplies any one of the encoded data units; and
    recovering the unencoded data unit based on decoding the obtained first prescribed number of encoded data units.

16. The method of claim 15, wherein the requesting includes determining an identifier for one of the unencoded data unit and stored locations of the second prescribed number of the encoded data units.

17. The method of claim 16, wherein the determining includes sending a request for the identifier to a source network node having generated the encoded data units.

18. The method of claim 17, wherein the determining further includes determining the stored locations based on applying a prescribed function to the identifier.

19. The method of claim 16, wherein the requesting includes sending a query for the stored locations to a prescribed shared directory configured for supplying storage addresses identifying the respective stored locations of the encoded data units.

20. The method of claim 15, wherein the requesting includes:
    sending requests for each of the first prescribed number of the encoded data units among the plurality of network nodes; and
    sending a second request for another one of the encoded data units to an alternate network node distinct from the plurality of network nodes.

21. The method of claim 20, wherein the sending a second request is based on one of:
    a determined absence of receiving one of encoded data units having been requested from among the plurality of network nodes;
    determining one of the encoded data units has been corrupted; and
    adding integrity to the recovering of the unencoded data unit.

22. The method of claim 21, wherein the prescribed encoding operation is Reed Solomon encoding, the recovering including executing Reed Solomon-based decoding of the first prescribed number of encoded data units to recover the unencoded data unit, the another one of the encoded data units used for one of adding integrity to the recovering of the unencoded data unit, and substituting the another one of the encoded data units in place of the one encoded data unit having been corrupted.

23. The method of claim 15, wherein the prescribed encoding operation is Reed Solomon encoding, the recovering including executing Reed Solomon-based decoding of the first prescribed number of encoded data units to recover the unencoded data unit.

24. The method of claim 23, wherein the first prescribed number equals at least (4) and the second prescribed number equals at least seven (7).

25. A network node configured for connection to a network, the network node comprising:
    means for encoding an unencoded data unit into a first prescribed number of encoded data units according to a prescribed encoding operation, the prescribed encoding operation causing each encoded data unit to be distinct from other ones of the encoded data units, the prescribed encoding operation further requiring at least a second prescribed number of the encoded data units for recovery of the unencoded data unit, the second prescribed number being less than the first prescribed number; and
    means for distributing the first prescribed number of encoded data units among selected network nodes for storage of the encoded data units in the network, the distributing including selecting the selected network nodes based on identified attributes of the unencoded data unit.

26. The network node of claim 25, wherein the means for encoding is configured for executing Reed Solomon encoding as the prescribed encoding operation.

27. The network node of claim 26, wherein the first prescribed number equals at least seven (7) and the second prescribed number equals at least four (4).

28. The network node of claim 26, wherein the means for distributing is configured for selecting the selected network nodes, from among available network nodes, based on a prescribed selection attribute.

29. The network node of claim 28, wherein the prescribed selection attribute includes at least one of random selection, distance from the corresponding selected network node, and reliability of the corresponding selected network node.

30. The network node of claim 28, wherein the means for distributing is configured for generating location identifiers for identifying respective encoded data units and the respective selected network nodes based on a prescribed function and applying, as the prescribed selection attribute, an identifier of the unencoded data unit.

31. The network node of claim 26, wherein the distributing means is configured for:
generating a copy of at least one of the encoded data units; and
sending the copy of the corresponding at least one encoded data unit to another selected network node distinct from the selected network node having received the corresponding at least one encoded data unit.

32. The network node of claim 26, wherein the distributing means is configured for providing at least one identifier to another network node, distinct from the selected network nodes, for enabling identification and retrieval by the another network node of at least the second prescribed number of encoded data units.

33. The network node of claim 32, wherein the at least one identifier includes storage addresses for the respective encoded data units stored in the network.

34. The network node of claim 33, wherein the means for distributing is configured for supplying the storage addresses in response to a request for access to the unencoded data unit from a requesting network node.

35. The network node of claim 33, wherein the another network node is a prescribed shared directory configured for supplying groups of the storage addresses for recovery of respective unencoded data units by requesting network nodes.

36. The network node of claim 32, wherein the means for distributing is configured for supplying the identifier in response to a request for access to the unencoded data unit from the another network node.

37. The network node of claim 25, wherein each encoded data unit is secure and unreadable relative to the unencoded data unit.

38. The network node of claim 25, wherein the means for distributing is configured for supplying less than the second prescribed number to any one of the network nodes.

39. A network node configured for connection to a network, the network node comprising:
means for requesting from among network nodes a first prescribed number of encoded data units, the encoded data units having been generated based on encoding an unencoded data unit into a second prescribed number of the encoded data units according to a prescribed encoding operation, the first prescribed number of encoded data units representing a minimum number of the encoded data units required for recovery of the unencoded data unit, wherein each encoded data unit is distinct from other ones of the encoded data units, the second prescribed number greater than the first prescribed number;
means for obtaining the first prescribed number of encoded data units from the network, wherein the means for obtaining receives less than the first prescribed number of encoded data units from any network node that supplies any one of the encoded data units; and
means for recovering the unencoded data unit based on decoding the obtained first prescribed number of encoded data units.

40. The network node of claim 39, wherein the means for requesting is configured for determining an identifier for one of the unencoded data unit and stored locations of the second prescribed number of the encoded data units.

41. The network node of claim 40, wherein the means for requesting is configured for sending a request for the identifier to a source network node having generated the encoded data units.

42. The network node of claim 41, wherein the means for requesting is configured for determining the stored locations based on applying a prescribed function to the identifier.

43. The network node of claim 40, wherein the means for requesting is configured for sending a query for the stored locations to a prescribed shared directory configured for supplying storage addresses identifying the respective stored locations of the encoded data units.

44. The network node of claim 39, wherein the means for requesting is configured for:
sending requests for each of the first prescribed number of the encoded data units among the plurality of network nodes; and
sending a second request for another one of the encoded data units to an alternate network node distinct from the plurality of network nodes.

45. The network node of claim 44, wherein the means for requesting is configured for sending the second request based on one of:
a determined absence of receiving one of encoded data units having been requested from among the plurality of network nodes;
a determination that one of the encoded data units has been corrupted; and
attempting addition of integrity to the recovering of the unencoded data unit.

46. The network node of claim 45, wherein the prescribed encoding operation is Reed Solomon encoding, the means for recovering configured for executing Reed Solomon-based decoding of the first prescribed number of encoded data units to recover the unencoded data unit, the another one of the encoded data units used for one of adding integrity to the recovering of the unencoded data unit, and substituting the another one of the encoded data units in place of the one encoded data unit having been corrupted.

47. The network node of claim 39, wherein the prescribed encoding operation is Reed Solomon encoding, the means for recovering configured for executing Reed Solomon-based decoding of the first prescribed number of encoded data units to recover the unencoded data unit.

48. The network node of claim 47, wherein the first prescribed number equals at least (4) and the second prescribed number equals at least seven (7).

49. A network node configured for connection to a network, the network node comprising:
an encoder portion configured for encoding an unencoded data unit into a first prescribed number of encoded data units according to a prescribed encoding operation, the prescribed encoding operation causing each encoded data unit to be distinct from other ones of the encoded data units, the prescribed encoding operation further requiring at least a second prescribed number of the encoded data units for recovery of the unencoded data unit, the second prescribed number being less than the first prescribed number; and
a distribution portion configured for distributing the first prescribed number of encoded data units among selected network nodes for storage of the encoded data units in the network, the distributing including selecting the selected network nodes based on identified attributes of the unencoded data unit.

50. The network node of claim 49, wherein the encoder portion is configured for executing Reed Solomon encoding as the prescribed encoding operation.

51. The network node of claim 50, wherein the first prescribed number equals at least seven (7) and the second prescribed number equals at least four (4).

52. The network node of claim 50, wherein the distribution portion is configured for selecting the selected network nodes, from among available network nodes, based on a prescribed selection attribute.

53. The network node of claim 52, wherein the prescribed selection attribute includes at least one of random selection, distance from the corresponding selected network node, and reliability of the corresponding selected network node.

54. The network node of claim 52, wherein the distribution portion is configured for generating location identifiers for identifying respective encoded data units and the respective selected network nodes based on a prescribed function and applying, as the prescribed selection attribute, an identifier of the unencoded data unit.

55. The network node of claim 50, wherein the distribution portion is configured for:
generating a copy of at least one of the encoded data units; and
sending the copy of the corresponding at least one encoded data unit to another selected network node distinct from the selected network node having received the corresponding at least one encoded data unit.

56. The network node of claim 50, wherein the distribution portion is configured for providing at least one identifier to another network node, distinct from the selected network nodes, for enabling identification and retrieval by the another network node of at least the second prescribed number of encoded data units.

57. The network node of claim 56, wherein the at least one identifier includes storage addresses for the respective encoded data units stored in the network.

58. The network node of claim 57, wherein the distribution portion is configured for supplying the storage addresses in response to a request for access to the unencoded data unit from a requesting network node.

59. The network node of claim 57, wherein the another network node is a prescribed shared directory configured for supplying groups of the storage addresses for recovery of respective unencoded data units by requesting network nodes.

60. The network node of claim 56, wherein the distribution portion is configured for supplying the identifier in response to a request for access to the unencoded data unit from the another network node.

61. The network node of claim 49, wherein each encoded data unit is secure and unreadable relative to the unencoded data unit.

62. The network node of claim 49, wherein the distribution portion is configured for supplying less than the second prescribed number to any one of the network nodes.

63. A network node configured for connection to a network, the network node comprising:
a requester portion configured for requesting from among network nodes a first prescribed number of encoded data units, the encoded data units having been generated based on encoding an unencoded data unit into a second prescribed number of the encoded data units according to a prescribed encoding operation, the first prescribed number of encoded data units representing a minimum number of the encoded data units required for recovery of the unencoded data unit, wherein each encoded data unit is distinct from other ones of the encoded data units, the second prescribed number greater than the first prescribed number;
the requester portion further configured for obtaining the first prescribed number of encoded data units from the network, the requester portion receiving less than the first prescribed number of encoded data units from any network node that supplies any one of the encoded data units; and
an encoder portion configured for recovering the unencoded data unit based on decoding the obtained first prescribed number of encoded data units.

64. The network node of claim 63, wherein the requester portion is configured for determining an identifier for one of the unencoded data unit and stored locations of the second prescribed number of the encoded data units.

65. The network node of claim 64, wherein the requester portion is configured for sending a request for the identifier to a source network node having generated the encoded data units.

66. The network node of claim 65, wherein the requester portion is configured for determining the stored locations based on applying a prescribed function to the identifier.

67. The network node of claim 64, wherein the requester portion is configured for sending a query for the stored locations to a prescribed shared directory configured for supplying storage addresses identifying the respective stored locations of the encoded data units.

68. The network node of claim 63, wherein the requester portion is configured for:
sending requests for each of the first prescribed number of the encoded data units among the plurality of network nodes; and
sending a second request for another one of the encoded data units to an alternate network node distinct from the plurality of network nodes.

69. The network node of claim 68, wherein the requester portion is configured for sending the second request based on one of:
a determined absence of receiving one of encoded data units having been requested from among the plurality of network nodes;
a determination that one of the encoded data units has been corrupted; and
attempting addition of integrity to the recovering of the unencoded data unit.

70. The network node of claim 69, wherein the prescribed encoding operation is Reed Solomon encoding, the encoder portion configured for executing Reed Solomon-based decoding of the first prescribed number of encoded data units to recover the unencoded data unit, the another one of the encoded data units used for one of adding integrity to the recovering of the unencoded data unit, and substituting the another one of the encoded data units in place of the one encoded data unit having been corrupted.

71. The network node of claim 63, wherein the prescribed encoding operation is Reed Solomon encoding, the encoder portion configured for executing Reed Solomon-based decoding of the first prescribed number of encoded data units to recover the unencoded data unit.

72. The network node of claim 71, wherein the first prescribed number equals at least (4) and the second prescribed number equals at least seven (7).

* * * * *